US008681905B2

(12) United States Patent
Miyanaga et al.

(10) Patent No.: US 8,681,905 B2
(45) Date of Patent: Mar. 25, 2014

(54) MIMO DETECTOR

(75) Inventors: Yoshikazu Miyanaga, Sapporo (JP);
Shingo Yoshizawa, Sapporo (JP)

(73) Assignee: RayTron, Inc., Osaka (JP)

( * ) Notice: Subject to any disclaimer, the term of this patent is extended or adjusted under 35 U.S.C. 154(b) by 0 days.

(21) Appl. No.: 13/447,745

(22) Filed: Apr. 16, 2012

(65) Prior Publication Data

US 2012/0269301 A1    Oct. 25, 2012

(30) Foreign Application Priority Data

Apr. 25, 2011   (JP) .................................. 2011-097101

(51) Int. Cl.
*H04L 27/06*         (2006.01)

(52) U.S. Cl.
USPC ........... 375/340; 375/341; 370/203; 370/210; 370/280

(58) Field of Classification Search
None
See application file for complete search history.

(56) References Cited

U.S. PATENT DOCUMENTS

| 7,986,919 | B2* | 7/2011 | Kangas et al. | ................ 455/63.1 |
| 2006/0221808 | A1* | 10/2006 | Shirakata et al. | ............. 370/203 |
| 2010/0284266 | A1* | 11/2010 | Jang et al. | ...................... 370/210 |

FOREIGN PATENT DOCUMENTS

JP      2004-179822 A    6/2004

OTHER PUBLICATIONS

Ishikawa, Y., et al., A 90-nm CMOS Motion Estimation Processor for MPEG4 implementing Dynamic Voltage and Frequency Scaling, Mar. 2007, pp. 1-6, Tokyo, Japan with English language Abstract.
Kuroda, T., et al., Variable Supply-Voltage Scheme for Low-Power High-Speed CMOS Digital Design, IEEE Journal of Solid-State Circuits, vol. 33, No. 3, Mar. 1998, pp. 1-9, Japan.
Masuda, N., et al., Design of Low Power and Small Size PLL Circuit, Prcoeedings of IEICE General Conference, 2009 IEICE Transactions on Electronics (2), p. 133, Mar. 4, 2009, Japan with English language Abstract.
Okumura, Y., et al., Basics of Mobile Communication, 1986, The Institutes of Electronics, Information and Communication Engineers, pp. 1-7, Japan with English language Abstract.
Takahata, F., Introduction to Digital Wireless Communication, Baifukan Co., Ltd., 2002, pp. 1-5, Japan with English language Abstract.

\* cited by examiner

*Primary Examiner* — Leon-Viet Nguyen
(74) *Attorney, Agent, or Firm* — Ditthavong Mori & Steiner, P.C.

(57) ABSTRACT

A MIMO detector for use in MIMO-OFDM wireless communication that forms a plurality of propagation paths by using a plurality of transmitting and receiving antennas includes: an inverse matrix calculator operating as an inverse matrix calculation unit configured to calculate an inverse matrix of a matrix of the propagation path based on a signal received by a receiver; a detection speed controller operating as an estimation unit configured to estimate a variation in the propagation path over time; and a phase synchronization circuit and a regulator configured to variably control a processing time required to calculate the inverse matrix by the inverse matrix calculator, according to the variation in the propagation path over time estimated by the detection speed controller. The MIMO detector is provided on the side of the receiver of the wireless communication.

3 Claims, 13 Drawing Sheets

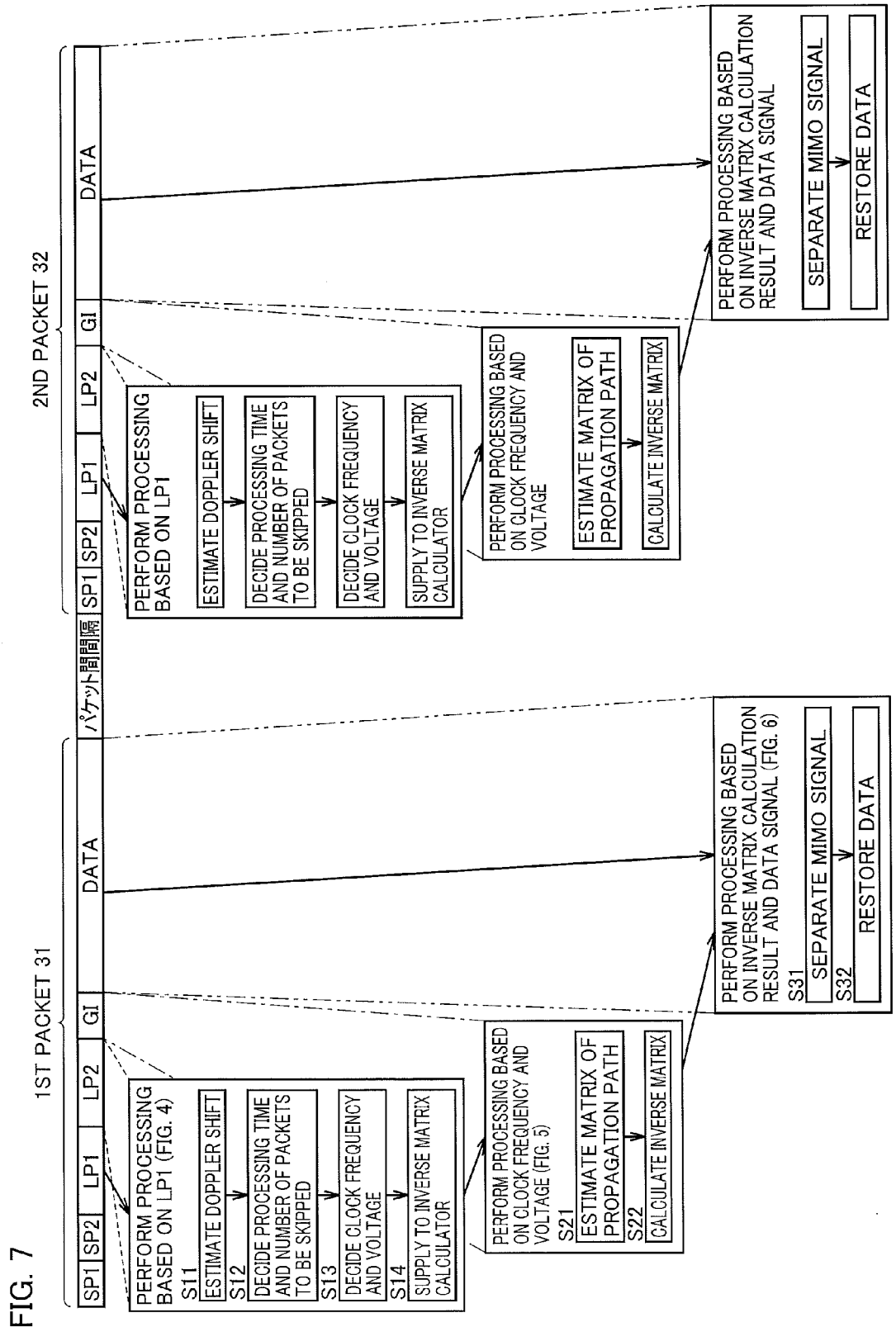

FIG. 8

| DOPPLER SHIFT [Hz] | VARIATION IN PROPAGATION PATH OVER TIME | NUMBER OF PACKETS TO BE SKIPPED | PROCESSING | CLOCK FREQUENCY (MHz) | VOLTAGE (V) | POWER CONSUMPTION WITHOUT VOLTAGE SCALING (mW) | POWER CONSUMPTION WITH VOLTAGE SCALING (mW) |
|---|---|---|---|---|---|---|---|
| GREATER THAN 20 | LARGE | ZERO | CALCULATE INVERSE MATRIX DURING DURATION OF GUARD INTERVAL USE INVERSE MATRIX CALCULATION RESULT TO RESTORE DATA SIGNAL OF SAME PACKET | 240 | 1.1 | 846.5445 | ✕ |

FIG. 10

| DOPPLER SHIFT [Hz] | VARIATION IN PROPAGATION PATH OVER TIME | NUMBER OF PACKETS TO BE SKIPPED | PROCESSING | CLOCK FREQUENCY (MHz) | VOLTAGE (V) | POWER CONSUMPTION WITHOUT VOLTAGE SCALING (mW) | POWER CONSUMPTION WITH VOLTAGE SCALING (mW) |
|---|---|---|---|---|---|---|---|
| 2 | SMALL (SHORT DETECTION DELAY MODE) | 16 | CALCULATE INVERSE MATRIX DURING PERIOD CORRESPONDING TO ONE PACKET USE INVERSE MATRIX CALCULATION RESULT TO RESTORE DATA SIGNALS OF 2ND TO 17TH PACKETS SKIP 16 PACKETS TO CALCULATE INVERSE MATRIX | 13.8857 | 0.45 | 81.4979 | 26.1362 |
| 4 | | | | | | | |
| 6 | | 8 | CALCULATE INVERSE MATRIX DURING PERIOD CORRESPONDING TO ONE PACKET USE INVERSE MATRIX CALCULATION RESULT TO RESTORE DATA SIGNALS OF 2ND TO 9TH PACKETS SKIP 8 PACKETS TO CALCULATE INVERSE MATRIX | | | | |
| 8 | | | | | | | |
| 10 | | | | | | | |
| 12 | | 4 | CALCULATE INVERSE MATRIX DURING PERIOD CORRESPONDING TO ONE PACKET USE INVERSE MATRIX CALCULATION RESULT TO RESTORE DATA SIGNALS OF 2ND TO 5TH PACKETS SKIP 4 PACKETS TO CALCULATE INVERSE MATRIX | | | | |
| 14 | | | | | | | |
| 16 | | | | | | | |
| 18 | | | | | | | |
| 20 | | | | | | | |

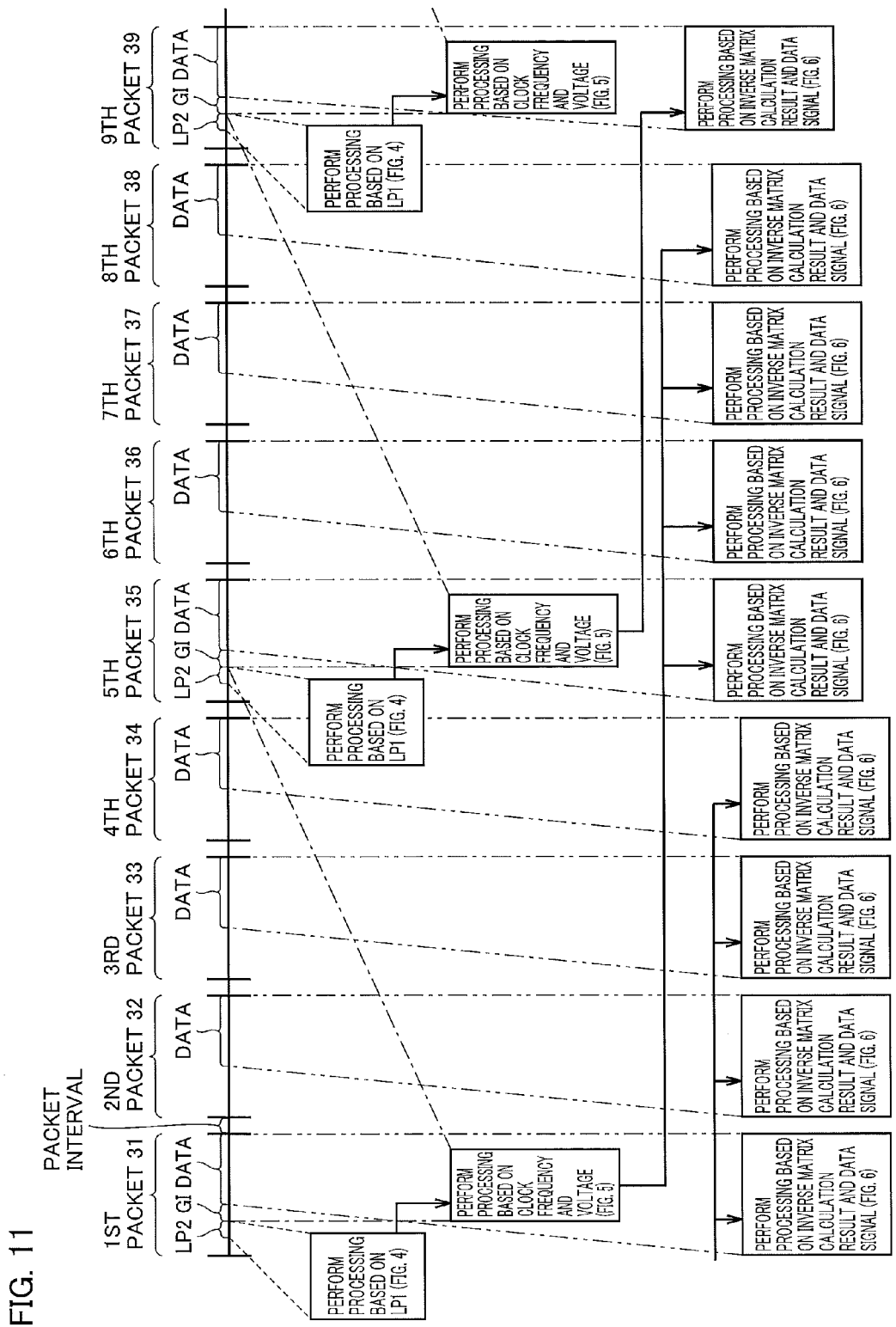

FIG. 12

| DOPPLER SHIFT [Hz] | VARIATION IN PROPAGATION PATH OVER TIME | NUMBER OF PACKETS TO BE SKIPPED | PROCESSING | CLOCK FREQUENCY (MHz) | VOLTAGE (V) | POWER CONSUMPTION WITHOUT VOLTAGE SCALING (mW) | POWER CONSUMPTION WITH VOLTAGE SCALING (mW) |
|---|---|---|---|---|---|---|---|
| 2 | | 16 | CALCULATE INVERSE MATRIX DURING PERIOD CORRESPONDING TO 16 PACKETS USE INVERSE MATRIX CALCULATION RESULT TO RESTORE DATA SIGNALS OF 17TH TO 32ND PACKETS SKIP 16 PACKETS TO CALCULATE INVERSE MATRIX | 0.917 | 0.33 | 43.1850 | 13.6518 |
| 4 | | 8 | CALCULATE INVERSE MATRIX DURING PERIOD CORRESPONDING TO 8 PACKETS USE INVERSE MATRIX CALCULATION RESULT TO RESTORE DATA SIGNALS OF 9TH TO 16TH PACKETS SKIP 8 PACKETS TO CALCULATE INVERSE MATRIX | 1.8271 | 0.35 | 45.8728 | 14.8270 |
| 6 | | | | | | | |
| 8 | SMALL (SHORT DETECTION DELAY MODE) | 4 | CALCULATE INVERSE MATRIX DURING PERIOD CORRESPONDING TO 4 PACKETS USE INVERSE MATRIX CALCULATION RESULT TO RESTORE DATA SIGNALS OF 5TH TO 8TH PACKETS SKIP 4 PACKETS TO CALCULATE INVERSE MATRIX | 3.6269 | 0.39 | 51.1913 | 17.4145 |
| 10 | | | | | | | |
| 12 | | 2 | CALCULATE INVERSE MATRIX DURING PERIOD CORRESPONDING TO 2 PACKETS USE INVERSE MATRIX CALCULATION RESULT TO RESTORE DATA SIGNALS OF 3RD TO 4TH PACKETS SKIP 2 PACKETS TO CALCULATE INVERSE MATRIX | 7.1471 | 0.42 | 61.5954 | 20.7247 |
| 14 | | | | | | | |
| 16 | | | | | | | |
| 18 | | | | | | | |
| 20 | | | | | | | |

MIMO DETECTOR

TECHNICAL FIELD

The present invention relates to MIMO detectors, and more particularly to MIMO detectors included in receivers having a large number of receiving antennas.

BACKGROUND ART

There has been a demand for higher speed communication and larger communication data capacity in recent wireless communication technology. A MIMO-OFDM technique combining multi input multi output (MIMO) and orthogonal frequency division multiplexing (OFDM) has attracted attention in response to such a demand. MIMO is a technique using a plurality of antennas by both a transmitter and a receiver, and OFDM is a modulation technique that is used in next-generation mobile communication such as long term evolution (LTE) due to its excellent bandwidth efficiency and high tolerance to the multipath fading environment.

An example of a receiver of the MIMO technique is disclosed in Japanese Unexamined Patent Application Publication No. 2004-179822 (paragraphs [0003] to [0008]).

According to Japanese Unexamined Patent Application Publication No. 2004-179822, in the MIMO technique, signals transmitted from transmitting antennas are received by receiving antennas, and a propagation path between the transmitting and receiving antennas is estimated based on known signals for estimating the propagation path, which are inserted in the signals received by the receiving antennas. The estimated propagation path is represented by a matrix based on the number of antennas of both the transmitter and the receiver. An inverse matrix of the propagation path is multiplied by the signals received by the receiving antennas, whereby the signals transmitted from the transmitting antennas are obtained.

SUMMARY OF INVENTION

In receivers for use in the MIMO-OFDM technique, in the current IEEE 802.11n Wireless LAN specification, a training signal and a data signal are included in each packet. As disclosed in Japanese Unexamined Patent Application Publication No. 2004-179822, a matrix of a propagation path is estimated based on the training signal as a known signal, and an inverse matrix of the estimated matrix of the propagation path is derived. This processing is referred to as "MIMO detection processing." After the MIMO detection process, the derived inverse matrix is multiplied by the data signal to separate only a transmission signal, thereby restoring data. Conventionally, the MIMO detection processing is always performed on every packet.

However, the matrix of the propagation path is defined by the number of antennas of both the transmitter and the receiver (the number of data streams). Thus, as the number of antennas increases, the amount of calculation of the inverse matrix increases significantly. The amount of calculation of the inverse matrix is proportional to $N^3$, where N represents the number of antennas. For example, the amount of calculation in a 4×4 MIMO configuration is eight times as large as the amount of calculation in a 2×2 MIMO configuration. In this case, performing the MIMO detection processing on every packet increases power consumption.

It is an object of the present invention to provide a MIMO detector capable of reducing power consumption.

A MIMO detector according to the present invention is used in MIMO-OFDM wireless communication that forms a plurality of propagation paths by using a plurality of transmitting and receiving antennas. The MIMO detector includes: an inverse matrix calculation unit configured to calculate an inverse matrix of a matrix of the propagation path based on a signal received by a receiver; an estimation unit configured to estimate a variation in the propagation path over time; and a variable control unit configured to variably control a processing time required to calculate the inverse matrix by the inverse matrix calculation unit, according to the variation in the propagation path over time estimated by the estimation unit. The MIMO detector is provided on a receiver side of the wireless communication.

According to this configuration, the processing time required to calculate the inverse matrix can be made variable according to the variation in the propagation path over time. That is, the processing time for calculating the inverse matrix can be varied according to the variation in the propagation path over time. Accordingly, for example, in the case where the variation in the propagation path over time is small, calculation of the inverse matrix can be controlled to be performed on every two or more packets. This can reduce power consumption.

Preferably, the inverse matrix calculation unit is an inverse matrix calculation circuit configured to calculate the inverse matrix, and the variable control unit variably controls the processing time required to calculate the inverse matrix, by variably controlling a clock frequency and a voltage that are to be supplied to the inverse matrix calculation circuit. This can reduce power consumption with a simple configuration.

More preferably, the receiver receives data as a plurality of packets, and if the estimation unit estimates that the variation in the propagation path over time is large, the variable control unit controls the clock frequency and the voltage so that the processing time required to calculate the inverse matrix is a duration of a guard interval of one packet.

More preferably, if the estimation unit estimates that the variation in the propagation path over time is small, the variable control unit controls the clock frequency and the voltage so that the processing time required to calculate the inverse matrix is a period corresponding to one packet or a period corresponding to a plurality of packets.

More preferably, the estimation unit estimates a Doppler shift.

According to the present invention, the processing time required to calculate an inverse matrix can be made variable according to the variation in the propagation path over time. That is, the processing time for calculating an inverse matrix can be varied according to the variation in the propagation path over time. Accordingly, for example, in the case where the variation in the propagation path over time is small, calculation of an inverse matrix can be controlled to be performed on every two or more packets. This can reduce power consumption.

BRIEF DESCRIPTION OF DRAWINGS

FIG. 7 is a timing chart of the processing shown in FIGS. 4 to 6 in the case where a variation in a propagation path over time is large.

FIG. 8 is a table showing the relation between the Doppler shift and the number of packets to be skipped, the clock frequency, and the voltage in the case where a variation in a propagation path over time is large.

FIG. 10 is a table showing the relation between the Doppler shift and the number of packets to be skipped, the clock frequency, and the voltage in the case where a variation in a propagation path over time is small.

FIG. 11 is a timing chart of the processing shown in FIGS. 4 to 6 in the case where a variation in a propagation path over time is small.

FIG. 12 is a table showing the relation between the Doppler shift and the number of packets to be skipped, the clock frequency, and the voltage in the case where a variation in a propagation path over time is small.

DESCRIPTION OF EMBODIMENTS

Figure 1:
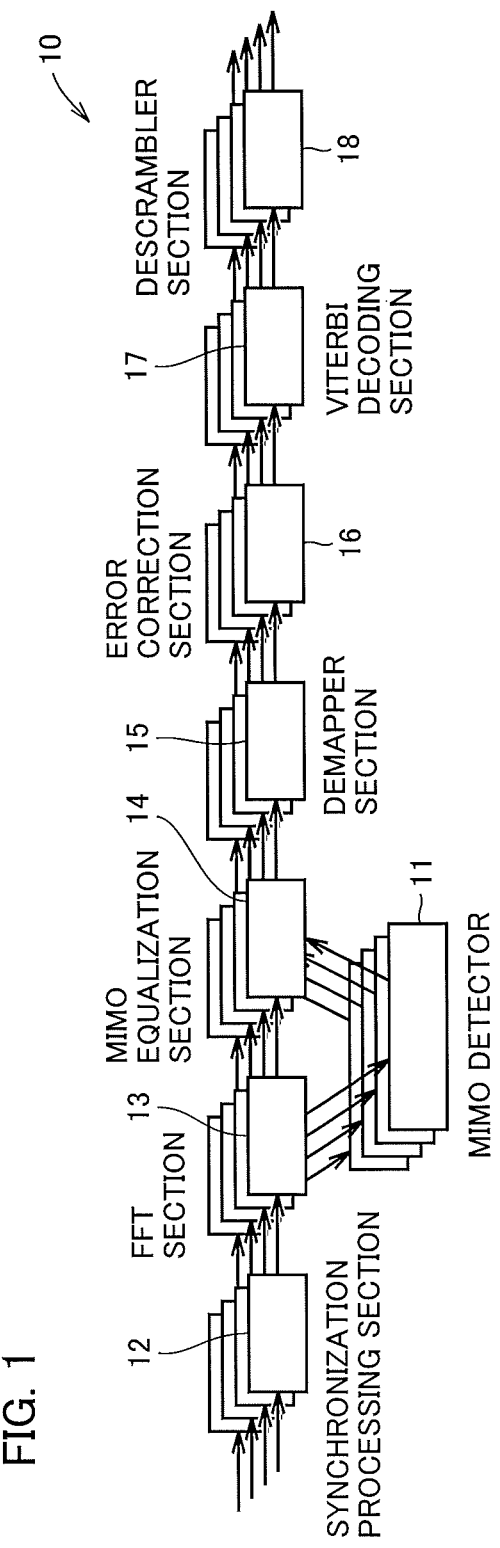
FIG. 1 is a block diagram showing a configuration of a receiver that is used in MIMO-OFDM wireless communication.

An MIMO detector according to an embodiment of the present invention will be described below with reference to the accompanying drawings. FIG. 1 is a block diagram showing the configuration of a receiver 10 that is used in MIMO-OFDM wireless communication. In the MIMO-OFDM wireless communication, a plurality of propagation paths are formed between a plurality of transmitting and receiving antennas to provide wireless communication. FIG. 1 shows an example using four receiving antennas. Referring to FIG. 1, the receiver 10 receives data from a transmitter including four transmitting antennas, not shown. The receiver 10 includes a synchronization processing section 12 configured to synchronize data between the transmitter and the receiver 10, a fast Fourier transform (FFT) section 13 configured to convert an OFDM signal to a plurality of subcarriers to perform a channel equalization on the subcarriers, a MIMO equalization section 14 configured to perform, after MIMO detection processing, MIMO signal separation by multiplying a derived inverse matrix by a data signal received from the FFT section 13 to separate only a transmission signal, a demapper section 15 configured to demap information on phases and amplitudes of the subcarriers to a bit string, an error correction section 16 configured to correct errors in the data caused during communication, a Viterbi decoding section 17 configured to decode the data encoded upon transmission based on a Viterbi algorithm, a descrambler section 18 configured to descramble a data string scrambled upon transmission, and a MIMO detector 11 configured to perform MIMO detection processing according to an embodiment of the present invention. The receiver 10 includes four of each section arranged in parallel so as to correspond to the number of receiving antennas.

Figure 2:
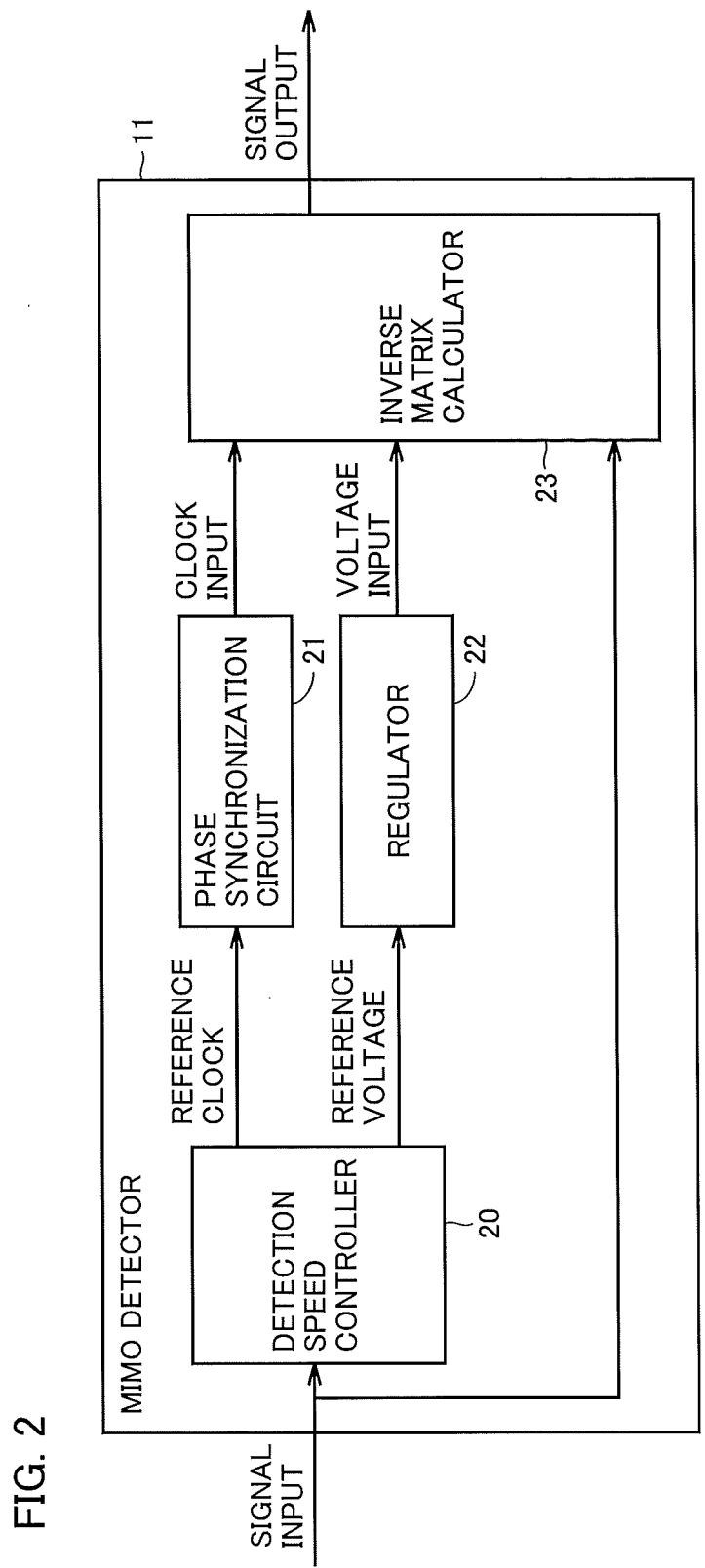
FIG. 2 is a block diagram showing a configuration of a MIMO detector.

FIG. 2 is a block diagram showing the configuration of the MIMO detector 11 shown in FIG. 1. Referring to FIG. 2, the MIMO detector 11 includes a detection speed controller 20, a phase synchronization circuit 21, a regulator 22, and an inverse matrix calculator 23 as an inverse matrix calculation circuit.

The detection speed controller 20 is, e.g., dynamic voltage and frequency scaling (DVFS) described in T. Kuroda and K. Suzuki et al., "Variable Supply-Voltage Scheme for Low-Power High-Speed CMOS Digital Design," IEEE J. Solid-State Circuits, vol. 33, pp. 454-462, March 1998. The detection speed controller 20 estimates a variation in the propagation path between the transmitting and receiving antennas over time, and decides a speed at which the inverse matrix calculator 23 is to calculate an inverse matrix. The phase synchronization circuit 21 controls an input reference clock to a predetermined clock frequency to supply the predetermined clock frequency to the inverse matrix calculator 23. The regulator 22 controls an input reference voltage to a predetermined voltage to supply the predetermined voltage to the inverse matrix calculator 23. Thus, the processing time for calculating an inverse matrix by the inverse matrix calculator 23 can be varied.

The inverse matrix calculator 23 calculates an inverse matrix based on the clock frequency controlled by the phase synchronization circuit 21 and the voltage controlled by the regulator 22. The operating speed of the inverse matrix calculator 23 is decided according to the clock frequency. The operating voltage of the inverse matrix calculator 23 is also decided according to the clock frequency. Thus, the operating voltage decreases as the clock frequency decreases.

Figure 3:
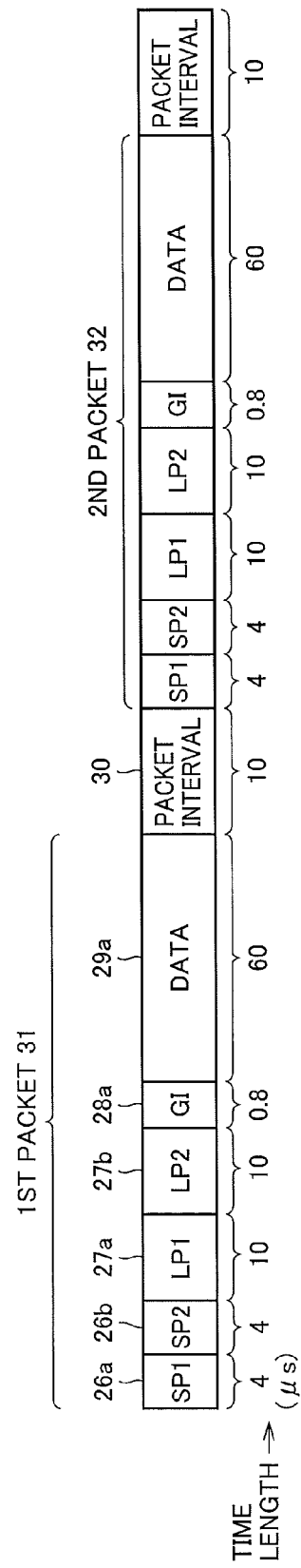
FIG. 3 is a diagram showing an example of data that is input to the MIMO detector.

FIG. 3 is a diagram showing an example of data that is input to the MIMO detector 11. The receiver 10 receives data divided into a plurality of packets. Thus, the MIMO detector 11 sequentially receives the data packets from the first one in the order of a first packet 31, a second packet 32, . . . , and an $n^{th}$ packet. The MIMO detector 11 receives the packets at packet intervals 30. Referring to FIG. 3, each packet includes a first short preamble (SP1) 26a and a second short preamble (SP2) 26b, which are used to synchronize data between the transmitter and the receiver 10, a first long preamble (LP1) 27a and a second long preamble (LP2) 27b, which are used to estimate a matrix of the propagation path between the transmitting and receiving antennas, a guard interval (GI) 28a, and a data signal (DATA) 29a. The data from the first short preamble (SP1) 26a to the second long preamble (LP2) 27a serves as a training signal. The MIMO detector 11 sequentially receives the data from the first short preamble (SP1) 26a. The duration (the time length) of the first short preamble (SP1) 26a and the second short preamble (SP2) 26b is, e.g., 4 μs each, the duration of the first long preamble (LP1) 27a and the second long preamble (LP2) 27b is, e.g., 10 μs each, the duration of the guard interval (GI) 28a is, e.g., 0.8 μs, and the duration of the data signal 29a is, e.g., 60 μs. Note that in FIG. 3, only the duration of the first short preamble (SP1) 26a is shown with a unit of time (microseconds, μs).

The MIMO detector 11 estimates a matrix of the propagation path based on the first long preamble (LP1) 27a and the second long preamble (LP2) 27b, and calculates an inverse matrix of the estimated matrix of the propagation path based on the clock frequency controlled by the phase synchronization circuit 21 and the voltage controlled by the regulator 22.

Figure 4:
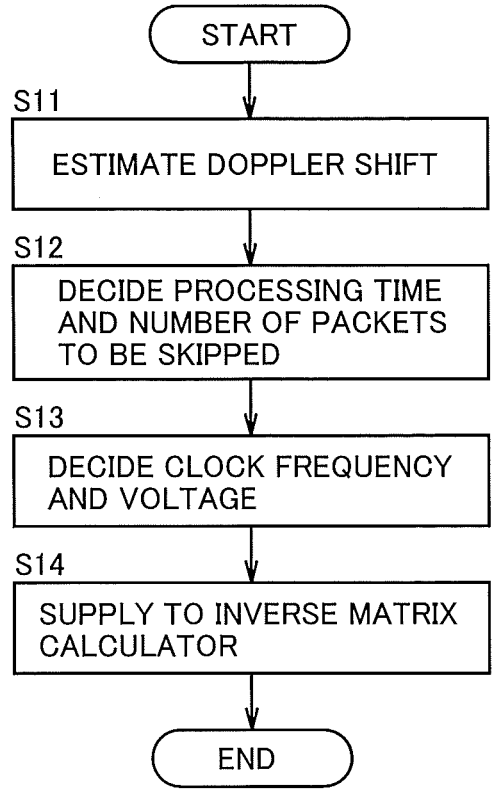
FIG. 4 is a flowchart illustrating operation of a detection speed controller.
Figure 5:
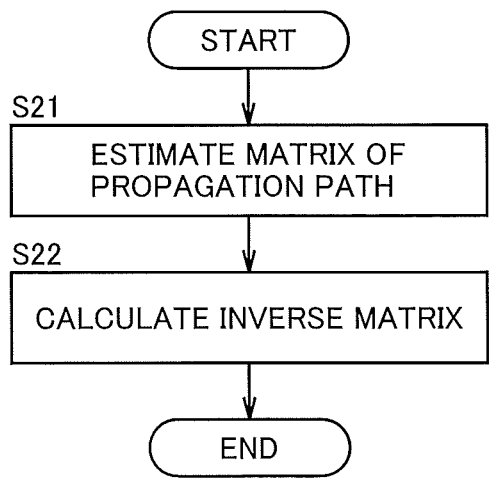
FIG. 5 is a flowchart illustrating operation of an inverse matrix calculator.
Figure 6:
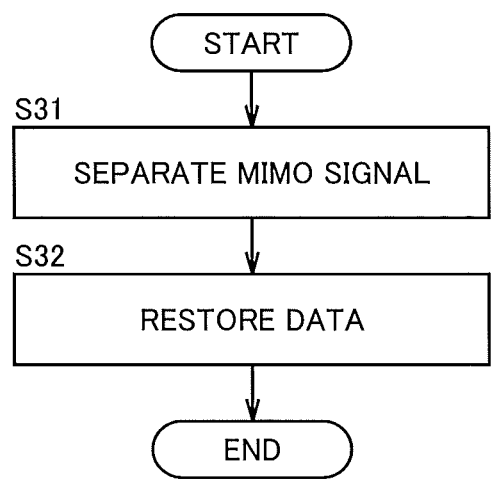
FIG. 6 is a flowchart illustrating operation of a MIMO equalization section.

Operation of the MIMO detector 11 will be described in detail below. FIG. 4 is a flowchart illustrating operation of the detection speed controller 20. FIG. 5 is a flowchart illustrating operation of the inverse matrix calculator 23. FIG. 6 is a flowchart illustrating operation of the MIMO equalization section 14 etc. Operation of the MIMO detector 11 will be described below with reference to FIGS. 4 to 6.

First, the MIMO detector 11 sequentially receives the packets as shown in FIG. 3. After the MIMO detector 11 receives the first long preamble (LP1) of the first packet 31, the detection speed controller 20 performs processing shown in FIG. 4 during reception of the second long preamble (LP2), namely for 10 µs.

Referring to FIG. 4, the detection speed controller 20 estimates a Doppler shift (step S11 in FIG. 4; hereinafter the term "step" will be omitted) based on the first long preamble (LP1) in order to estimate a variation in the propagation path over time. The detection speed controller 20 operates as an estimation unit. Specifically, the detection speed controller 20 estimates a Doppler shift by first calculating a Doppler shift for each channel and then obtaining an average value of the Doppler shifts of the channels.

Known methods can be used to calculate a Doppler shift for each channel. For example, the known methods can be used in a manner described in Fumio Takahata, "Introduction to Digital Wireless Communication," BAIFUKAN CO., LTD. (2002) and Yoshihisa Okumura and Masaaki Shinji, "Basics of Mobile Communication" the Institute of Electronics, Information and Communication Engineers (IEICE), 1986. For example, it is known that when a wireless propagation path is modeled by Rayleigh fading, time autocorrelation of a signal can be approximated by a Bessel function using a Doppler shift as a variable. By using this relation, a Doppler shift is calculated from a time autocorrelation coefficient of the received signal and an inverse function of the Bessel function. For example, a communication environment is determined in advance, and channel characteristics for a Doppler frequency of 0 Hz are assumed. The difference between the assumed channel characteristics and actually observed channel characteristics is regarded as Doppler characteristics, and a Doppler shift is calculated based on this difference.

The processing time required to calculate an inverse matrix, namely the processing time for calculating an inverse matrix, is determined according to the estimated Doppler shift (S12). For example, it is decided if the inverse matrix is to be calculated during the duration of the guard interval (GI), during a period corresponding to one packet, or during a period corresponding to a plurality of packets. At this time, the processing time is decided so that communication quality is not reduced, for example, so that the bit error rate or the packet error rate has a predetermined value or less.

The number of packets to be skipped is also decided according to the estimated Doppler shift (S12). As used herein, the "number of packets to be shifted" indicates the packet for which the calculation result of the inverse matrix is used when multiplying the calculation result of the inverse matrix obtained in the MIMO detector 11 by the data signal from the FFT section 13 in the MIMO equalization section 14. The number of packets to be skipped has a value equal to or larger than the number of packets required for the processing time. For example, in the case where the number of packets to be skipped is one, and an inverse matrix is calculated for the first packet, the calculation result of the inverse matrix is used for the data signal of the second packet if the processing time for calculating the inverse matrix is a period corresponding to one packet. In the case where the number of packets to be skipped is two, and an inverse matrix is calculated for the first packet, the calculation result of the inverse matrix is used for the data signals of the second packet and the third packet if the processing time for calculating the inverse matrix is a period corresponding to one packet. That is, if the number of packets to be skipped is one or more, the packet including the first and second long preambles (LP1, LP2) used to calculate the inverse matrix is different from the packet including the data signal.

Then, the detection speed controller 20 decides a clock frequency and a voltage that are to be supplied to the inverse matrix calculator 23, according to the processing time (S13). The phase synchronization circuit 21 and the regulator 22 operate as a variable control unit.

For example, a table corresponding to Doppler shifts is prestored so that the processing time, the number of packets to be skipped, the clock frequency, and the voltage in S12 and S13 can be decided by referring to the table. For example, the tables shown in FIGS. 8, 10, and 12 described later may be used as the table.

Thereafter, the phase synchronization circuit 21 and the regulator 22 control the reference clock and the reference voltage to the clock frequency and the voltage decided in S13, and supply the clock frequency and the voltage to the inverse matrix calculator 23, respectively (S14).

Referring to FIG. 5, the inverse matrix calculator 23 estimates a matrix of the propagation path based on the first and second long preambles (LP1, LP2) (S21), and calculates an inverse matrix of the estimated matrix of the propagation path by using the clock frequency and the voltage supplied in S14 (S22). The inverse matrix calculator 23 operates as an inverse matrix calculation unit.

Referring to FIG. 6, the MIMO equalization section 14 multiplies the inverse matrix calculated by the inverse matrix calculator 23 by a data signal to separate only a transmission signal (S31). Then, data is restored via the demapper section 15 etc.

In this manner, the MIMO detector 11 changes the clock frequency and the voltage based on the Doppler shift to calculate an inverse matrix.

A specific example will be described below in which the Doppler shift estimated in S11 is greater than 20 Hz. The Doppler shift being greater than 20 Hz means that the propagation path varies significantly over time, namely a variation in the propagation path over time is large. That is, it means that the propagation path varies significantly between the plurality of packets.

In this case, data may not be properly restored if the packet that is used to calculate an inverse matrix is different from the packet of a data signal. Thus, it is decided in S12 that the processing time for calculating an inverse matrix is the duration of the guard interval (GI) and that the number of packets to be skipped is zero. Accordingly, the packet that is used to calculate the inverse matrix is the same as the packet of the data signal.

FIG. 7 is a timing chart of the processing shown in FIGS. 4 to 6 in the case where the variation in the propagation path over time is large. Referring to FIG. 7, in this case, during reception of the second long preamble (LP2) of the first packet 31, it is determined from the Doppler shift that the variation in the propagation path over time is large, and the clock frequency and the voltage are decided so that an inverse matrix can be calculated during the duration (0.8 µs) of the guard interval (GI) (S11 to S14 in FIG. 4). Then, an inverse matrix is calculated during the duration of the guard interval (GI) of the first packet 31 (S21 to S22 in FIG. 5). After the guard interval (GI), data of the data signal of the first packet 31 is restored by using the calculation result of the inverse matrix (S31 to S32 in FIG. 6).

As described above, in the case where the variation in the propagation path over time is large, calculation of an inverse matrix is performed at a high speed. In this case, the processing time ($P_0$) for calculating an inverse matrix is $P_0 = T_F$, where $T_F$ represents the duration of the guard interval (GI).

FIG. 8 is a table showing the relation between the Doppler shift and the number of packets to be skipped, the clock frequency, and the voltage in the case where the variation in the propagation path over time is large. Referring to FIG. 8, since the Doppler shift is greater than 20 Hz, an inverse matrix is calculated during the propagation of the guard interval (GI) of one packet, and the calculation result of the inverse matrix is used to restore the data signal of the same packet. The clock frequency and the voltage in S13 are controlled to 240 MHz and 1.1 V by the phase synchronization circuit 21 and the regulator 22, respectively. In this case, power consumption without voltage scaling is 846.5445 mW.

An example will be described below in which the Doppler shift estimated in S11 is equal to or less than 20 Hz. The Doppler shift being equal to or less than 20 Hz means that the propagation path varies slightly over time, namely a variation in the propagation path over time is small. That is, it means that the propagation path hardly varies between the plurality of packets.

In this case, data can be properly restored even if the packet that is used to calculate an inverse matrix is different from the packet of a data signal. Thus, in this embodiment, it is decided in S12 that the processing time for calculating an inverse matrix is a period corresponding to one packet, and that the number of packets to be skipped is, e.g., 4.

Figure 9:
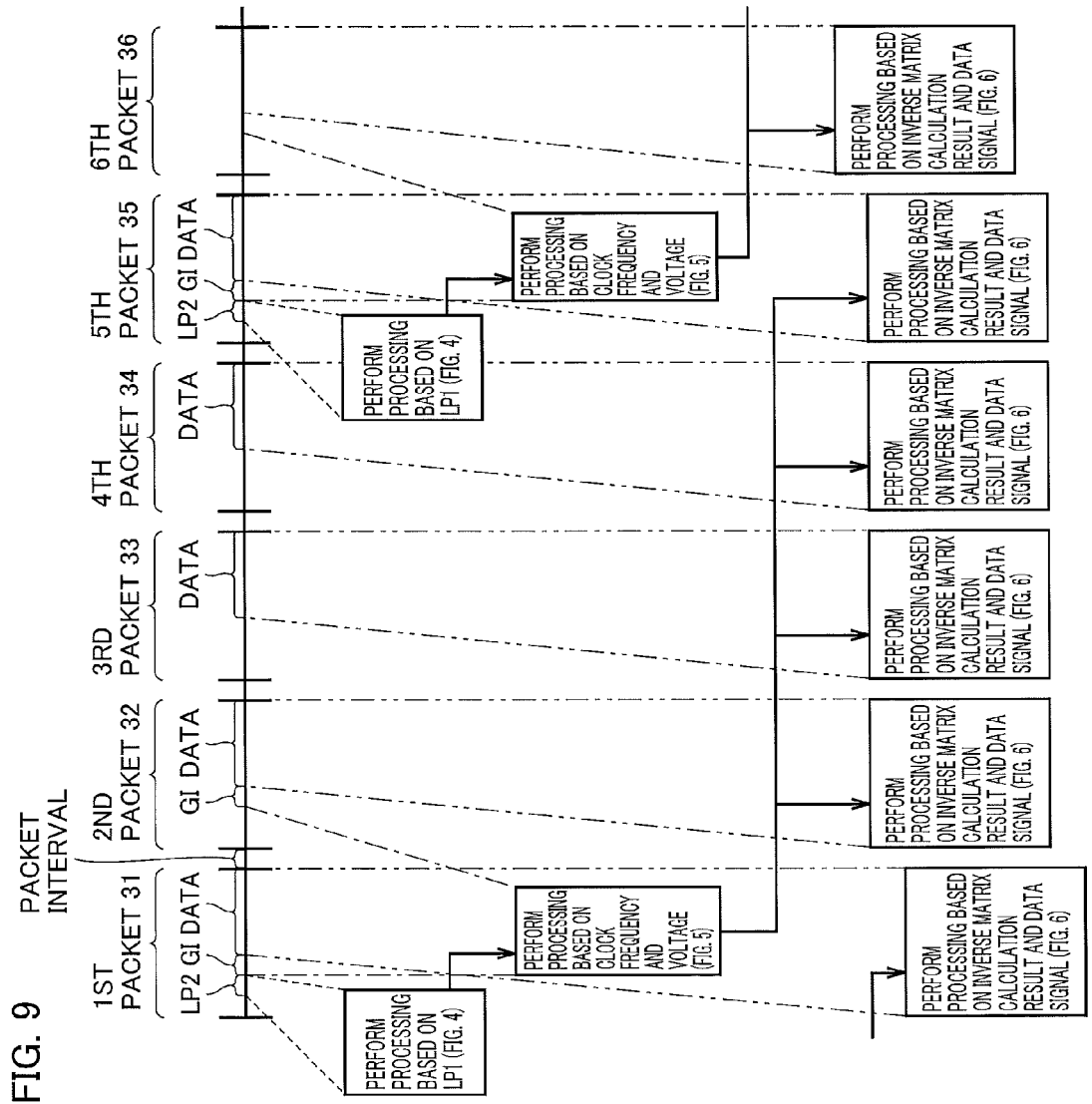
FIG. 9 is a timing chart of the processing shown in FIGS. 4 to 6 in the case where a variation in a propagation path over time is small.

FIG. 9 is a timing chart of the processing shown in FIGS. 4 to 6 in the case where the variation in the propagation path over time is small. Note that a specific configuration of each packet shown in FIG. 3 is omitted in FIG. 9. The flowchart of the processing shown in FIG. 7 is also omitted in FIG. 9. Referring to FIG. 9, in this case, during reception of the second long preamble (LP2) of the first packet 31, it is determined from the Doppler shift that the variation in the propagation path over time is small, and the clock frequency and the voltage are decided so that an inverse matrix can be calculated during the period from the guard interval (GI) of the first packet 31 to the second long preamble (LP2) of the second packet 32 (S11 to S14 in FIG. 4). That is, in this embodiment, the clock frequency and the voltage are decided so that an inverse matrix can be calculated during a period corresponding to one packet.

Then, an inverse matrix is calculated during a period corresponding to one packet, namely the period from the guard interval (GI) of the first packet 31 to the second long preamble (LP2) of the second packet 32 (S21 to S22 in FIG. 5). After the second long preamble (LP2) of the second packet 32, data of the data signals of the second to fifth packets 32 to 35 is restored by using the calculation result of the inverse matrix (S31 to S32 in FIG. 6). Similarly, an inverse matrix is calculated again during a period corresponding to one packet, namely a period from the fifth packet 35 to the sixth packet 36 after the number of packets to be skipped.

In the case where it is decided that the number of packets to be skipped is, e.g., 1, an inverse matrix is calculated during a period corresponding to one packet, and after the second long preamble (LP2) of the second packet 32, data of only the data signal of the second packet 32 is restored by using the calculation result of the inverse matrix.

As described above, in the case where the variation in the propagation path over time is small, an inverse matrix is calculated during a period corresponding to one packet. In this case, calculation of an inverse matrix is performed at a low speed. The number of packets for which data is to be restored by using the calculation result of the inverse matrix is varied according to the number of packets to be skipped. A situation in which an inverse matrix is calculated during a period corresponding to one packet is herein referred to as the "short detection delay mode." In this case, the processing time ($P_1$) for calculating an inverse matrix is $P_1=(T_F+T_D+T_I+T_L)$, where $T_F$ represents the duration of the guard interval (GI), $T_D$ represents the duration of the data signal, $T_I$ represents the packet interval, and $T_L$ represents the period from the first short preamble (SP1) to the second long preamble (LP2).

FIG. 10 is a table showing the relation between the Doppler shift and the number of packets to be skipped, the clock frequency, and the voltage in the case where the variation in the propagation path over time is small. Referring to FIG. 10, since the Doppler shift is equal to or less than 20 Hz, an inverse matrix is calculated during a period corresponding to one packet. According to the number of packets to be skipped, data of the data signals of the packets following the packet used to calculate the inverse matrix is restored by using the calculation result of the inverse matrix. In this case, the clock frequency and the voltage in S13 are controlled to 13.8857 MHz and 0.45 V by the phase synchronization circuit 21 and the regulator 22, respectively. In this case, power consumption without voltage scaling is 81.4979 mW, and power consumption with voltage scaling is 26.1362 mW. Note that in this case, the processing time for calculating an inverse matrix is a period corresponding to one packet. Accordingly, power consumption does not change even if the number of packets to be skipped is changed to 16 or 8.

In this short detection delay mode, the number of packets to be skipped can be changed according to the Doppler shift.

Another example in which the Doppler shift estimated in S11 is equal to or less than 20 Hz. As described above, the Doppler shift being equal to or less than 20 Hz means that the propagation path varies slightly over time, namely a variation in the propagation path over time is small. In this example, it is decided that the processing time for calculating an inverse matrix is a period corresponding to a plurality of packets, such as a period corresponding to four packets, and that the number of packets to be skipped is, e.g., 4.

FIG. 11 is a timing chart of the processing shown in FIGS. 4 to 6 in the case where the variation in the propagation path over time is small. Note that a specific configuration of each packet shown in FIG. 3 is omitted in FIG. 11. The flowchart of the processing shown in FIG. 7 is also omitted in FIG. 11. Referring to FIG. 11, in this case, during reception of the second long preamble (LP2) of the first packet 31, it is determined from the Doppler shift that the variation in the propagation path over time is small, and the clock frequency and the voltage are decided so that an inverse matrix can be calculated during the period from the guard interval (GI) of the first packet 31 to the second long preamble (LP2) of the fifth packet 35 (S11 to S14 in FIG. 4). That is, in this embodiment, the clock frequency and the voltage are decided so that an inverse matrix can be calculated during a period corresponding to four packets.

Then, an inverse matrix is calculated during a period corresponding to four packets, namely the period from the guard interval (GI) of the first packet 31 to the second long preamble (LP2) of the fifth packet 35 (S21 to S22 in FIG. 5). After the second long preamble (LP2) of the fifth packet 35, data of the data signals of the fifth to eighth packets 35 to 38 is restored by using the calculation result of the inverse matrix (S31 to S32 in FIG. 6). Similarly, an inverse matrix is calculated again during a period corresponding to four packets, namely a period from the fifth packet 35 to the eighth packet 38 after the number of packets to be skipped.

As described above, in the case where the variation in the propagation path over time is small, an inverse matrix is calculated during a period corresponding to a plurality of packets. In this case, calculation of an inverse matrix is performed at a low speed. The number of packets whose data is to be restored by using the calculation result of the inverse matrix is varied according to the number of packets to be skipped. A situation in which an inverse matrix is calculated during a period corresponding to a plurality of packets is herein referred to as the "long detection delay mode." In this case, the processing time ($P_2$) for calculating an inverse matrix is $P_2=(T_F+T_D+T_I+T_L)\times$the number of packets.

FIG. 12 is a table showing the relation between the Doppler shift and the number of packets to be skipped, the clock frequency, and the voltage in the case where the variation in the propagation path over time is small. Referring to FIG. 12, since the Doppler shift is equal to or less than 20 Hz, an inverse matrix is calculated during a period corresponding to two or more packets such as 16 packets. According to the number of packets to be skipped, data of the data signals of the packets following the packet used to calculate the inverse matrix is restored by using the calculation result of the inverse matrix. In this case, the clock frequency and the voltage in S13 are controlled to 0.917 MHz and 0.33 V by the phase synchronization circuit 21 and the regulator 22, respectively. In this case, power consumption without voltage scaling is 43.1850 mW, and power consumption with voltage scaling is 13.6518 mW. In this case, power consumption decreases as the processing time for calculating an inverse matrix increases.

In this long detection delay mode, the number of packets required to calculate an inverse matrix is the same as the number of packets to be skipped, and the number of packets required to calculate an inverse matrix and the number of packets to be skipped can be changed according to the Doppler shift.

As described above, according to the present invention, the processing time required to calculate an inverse matrix can be made variable according to the variation in the propagation path over time. That is, the processing time for calculating an inverse matrix can be varied according to the variation in the propagation path over time. Thus, for example, in the case where the variation in the propagation path over time is small, calculation of an inverse matrix can be controlled to be performed at every two or more packets. This can reduce power consumption.

In this case, in the case where the variation in the propagation path over time is large, data may not be properly restored if the packet that is used to calculate an inverse matrix is different from the packet of a data signal. Accordingly, the processing time for calculating an inverse matrix is the duration of the guard interval (GI). In the case where the variation in the propagation path over time is small, data can be properly restored even if the packet that is used to calculate an inverse matrix is different from the packet of a data signal. Accordingly, the processing time for calculating an inverse matrix is a period corresponding to one packet or a period corresponding to a plurality of packets. Thus, communication quality is not reduced even if the processing time for calculating an inverse matrix is changed according to the variation in the propagation path over time.

Table 1 shows the relation between the power consumption and the processing time shown in FIGS. 8, 10, and 12.

[Table 1]

Referring to Table 1, power consumption (81.4979 mW) in the case where calculation of an inverse matrix is performed during a period corresponding to one packet (without voltage scaling) is about one tenth of power consumption (846.5445 mW) in the case where calculation of an inverse matrix is performed during the duration of the guard interval (GI). Power consumption (43.1850 mW) in the case where calcu-lation of an inverse matrix is performed during a period corresponding to a plurality of packets such as 16 packets (without voltage scaling) is about one twentieth of power consumption (846.5445 mW) in the case where calculation of an inverse matrix is performed during the duration of the guard interval (GI). Moreover, power consumption (13.6518 mW) in the case where calculation of an inverse matrix is performed during a period corresponding to 16 packets (with voltage scaling) is about one sixtieth of power consumption (846.5445 mW) in the case where calculation of an inverse matrix is performed during the duration of the guard interval (GI). Power consumption is thus reduced.

A method for calculating the clock frequency will be described below. The clock frequency is obtained by calculating a speed ratio of the processing time $P_0$ for calculating an inverse matrix during the duration of the guard interval (GI) shown in FIG. 7 to the processing time $P_1$ (the short detection delay mode) for calculating an inverse matrix during a period corresponding to one packet or the processing time $P_2$ (the long detection delay mode) for calculating an inverse matrix during a period corresponding to a plurality of packets, and multiplying the calculated speed ratio by the maximum clock frequency $f_s$. The maximum clock frequency $f_s$ is a value corresponding to high speed operation in which an inverse matrix is calculated during the duration of the guard interval (GI). Thus, the clock frequency f is $f=f_s$ in this high speed operation, is $f=(P_0/P_1)f_s$ in the short detection delay mode, and is $f=(P_0/P_2)f_s$ in the long detection delay mode.

The voltage is obtained from the clock frequency. The relation between the clock frequency and the voltage can be represented by the following expression (1) shown in D. Sengupta and R. Saleh, "Power-Delay Metrics Revisited for 90 nm CMOS Technology," IEEE International Symposium on Quality of Electronic Design (ISQED), Mar. 21-23, 2005, pp. 291-296.

$$f = \frac{k_1(V_{DD} - V_T)^2}{NV_{DD}(V_{DD} - V_T + k_2)} \tag{1}$$

In the expression (1), "f" represents a clock frequency, "$V_{DD}$" represents a voltage, "$k_1$" and "$k_2$" represent constants depending on the circuit process, "N" represents the total number of transistors in a circuit, and "$V_T$" represents a threshold voltage of a complementary metal oxide semiconductor (CMOS) transistor. Based on the expression (1), the voltage is obtained from the clock frequency. A power formula for dynamic power of a CMOS circuit can be represented by the following expression (2).

$$\text{Power}=CV_{DD}^2f \tag{2}$$

In the expression (2), "Power" represents electric power, and "C" represents capacitor capacitance in the circuit.

Referring to the expression (2), since the electric power is proportional to the clock frequency and is proportional to the square of the voltage, power consumption can be reduced by reducing the clock frequency and the voltage.

Figure 13:
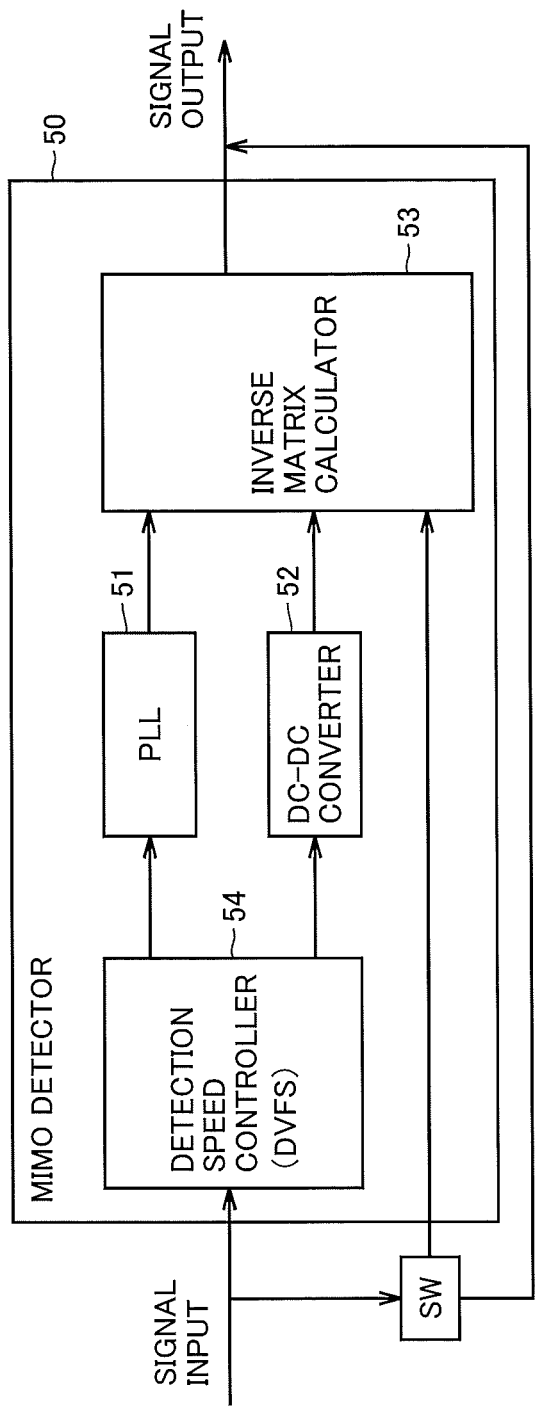
FIG. 13 is a diagram showing a configuration of an MIMO detector used in a simulation.

The relations between the Doppler shift and the number of packets to be skipped as shown in FIGS. 8, 10, and 12 are based on the simulation result shown below. FIG. 13 is a diagram showing the configuration of a MIMO detector 50 used in the simulation. A phase locked loop (PLL) 51 is used as the phase synchronization circuit 21 of the MIMO detector 11 shown in FIG. 2, and a direct current to direct current (DC-DC) converter 52 is used as the regulator 22 of the MIMO detector 11. The PLL 51 and the DC-DC converter 52 were used based on Ishikawa et al., "A 90-nm CMOS Motion Estimation Processor for MPEG4 implementing Dynamic Voltage and Frequency Scaling" IEICE Technical Report, ICD 2006-201, pp. 25-30, Feb. 28, 2007, and Masuda et al., "Design of Low Power and Small Size PLL Circuit," Proceedings of IEICE General Conference, 2009 IEICE Transactions on Electronics (2), p. 133, Mar. 4, 2009. The simulation was conducted under the conditions shown in Table 2 below.

[Table 2]

Figure 14:
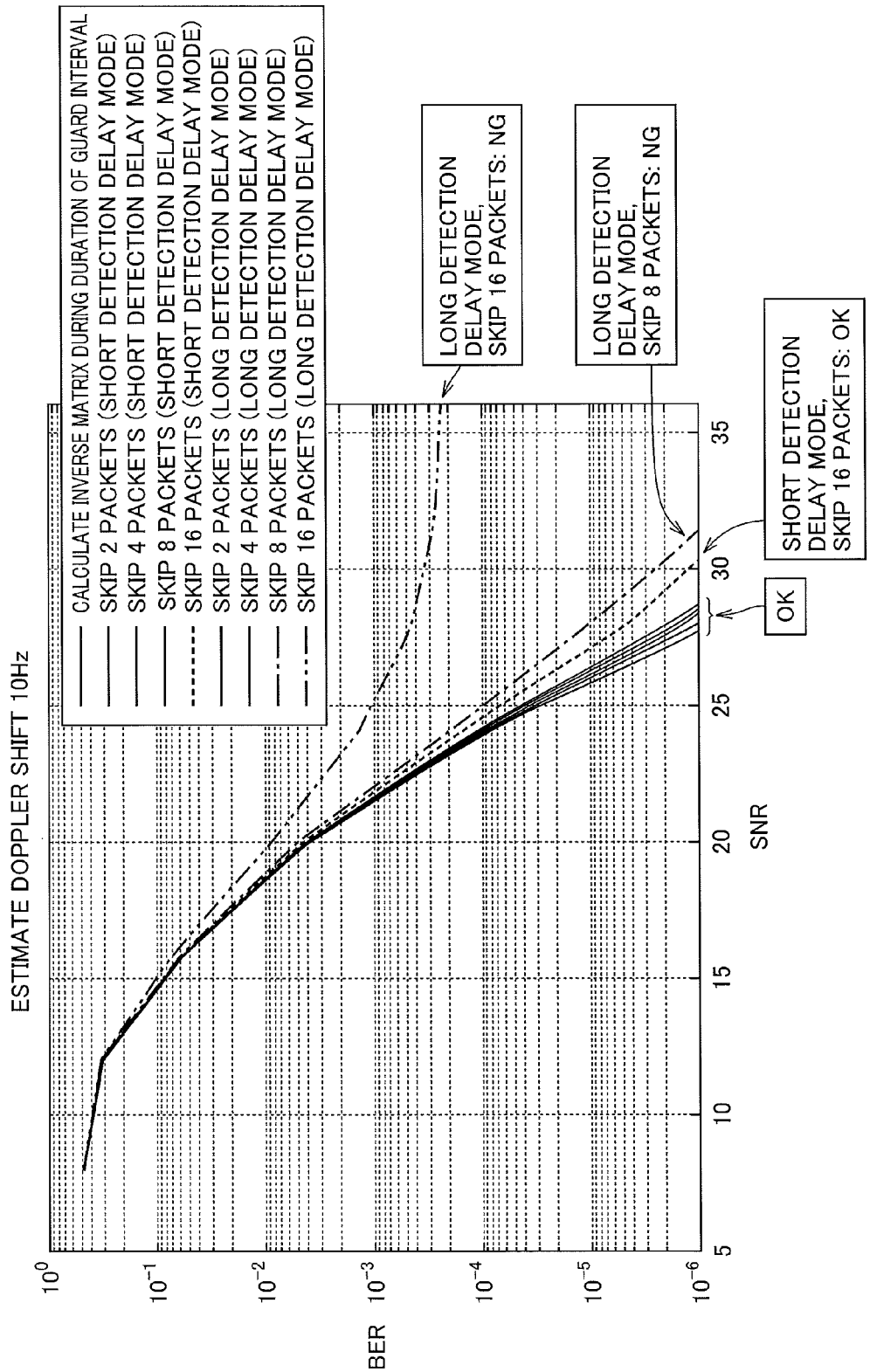
FIG. 14 is a graph showing SNR-BER characteristics for the Doppler shift of 10 Hz.

Signal-Noise Ratio (SNR)-Bit Error Rate (BER) characteristics were calculated for the Doppler shift in the range of 2 to 20 Hz under the conditions of Table 2. FIG. 14 is a graph showing the SNR-BER characteristics for the Doppler shift of 10 Hz.

In the long detection delay mode, the SNR-BER characteristics are not acceptable (NG) in the case where the number of packets to be skipped is 16 and 8, and are acceptable (OK) in the case where the number of packets to be skipped is 4 or less. Accordingly, referring to FIG. 12, the number of packets to be skipped is 4 for the Doppler shift of 10 Hz. In the short detection delay mode, the SNR-BER characteristics are not acceptable (NG) in the case where the number of packets to be skipped is 16, and are acceptable (OK) in the case where the number of packets to be skipped is 8 or less. Accordingly, referring to FIG. 10, the number of packets to be skipped is 8 for the Doppler shift of 10 Hz. In this manner, the number of packets to be skipped, which provides acceptable SNR-BER characteristics (OK), was decided for each Doppler shift shown in FIGS. 8, 10, and 12.

The above embodiment is described with respect to an example in which the clock frequency and the voltage are decided by referring to the table. However, the present invention is not limited to this, and the voltage may be calculated from the clock frequency by using the above expression (1).

The above embodiment is described with respect to an example in which the phase synchronization circuit 21 and the regulator 22 control and supply the clock frequency and the voltage to the inverse matrix calculator 23. However, the present invention is not limited to this, and the phase synchronization circuit 21 and the regulator 22 may be connected to the outside of a large scale integrated circuit (LSI) chip of the inverse matrix calculator 23, or may be integrated in the same LSI chip.

The above embodiment is described with respect to an example in which a Doppler shift is estimated to estimate the variation in the propagation path over time. However, the present invention is not limited to this, and other methods may be used to estimate the variation in the propagation path over time.

The above embodiment is described with respect to an example in which in the long detection delay mode, the number of packets required to calculate an inverse matrix is the same as the number of packets to be skipped. However, the present invention is not limited to this, and the number of packets required to calculate an inverse matrix may be different from the number of packets to be skipped.

Although the embodiment of the present invention is described above with reference to the drawings, the present invention is not limited to the illustrated embodiment. Various modifications and variations can be made to the illustrated embodiment without departing from the spirit and scope of the present invention.

The present invention is advantageously used in MIMO-OFDM wireless communication.

The invention claimed is:

1. A MIMO detector for use in MIMO-OFDM wireless communication that forms a plurality of propagation paths by using a plurality of transmitting and receiving antennas, comprising:
    an inverse matrix calculation unit configured to calculate an inverse matrix of a matrix of said propagation path based on a signal received by a receiver;
    an estimation unit configured to estimate a variation in said propagation path over time; and
    a variable control unit configured to variably control a processing time required to calculate said inverse matrix by said inverse matrix calculation unit, according to said variation in said propagation path over time estimated by said estimation unit, wherein
    said MIMO detector is provided on a receiver side of said wireless communication,
    said inverse matrix calculation unit is an inverse matrix calculation circuit configured to calculate said inverse matrix, and
    said variable control unit variably controls said processing time required to calculate said inverse matrix, by variably controlling a clock frequency and a voltage that are to be supplied to said inverse matrix calculation circuit.

2. The MIMO detector according to claim 1, wherein said receiver receives data as a plurality of packets, and if said estimation unit estimates that said variation in said propagation path over time is large, said variable control unit controls said clock frequency and said voltage so that said processing time required to calculate said inverse matrix is a duration of a guard interval of one packet.

3. The MIMO detector according to claim 2, wherein if said estimation unit estimates that said variation in said propagation path over time is small, said variable control unit controls said clock frequency and said voltage so that said processing time required to calculate said inverse matrix is a period corresponding to one packet or a period corresponding to a plurality of packets.

* * * * *